United States Patent [19]
Bunch et al.

[11] Patent Number: 5,737,108
[45] Date of Patent: Apr. 7, 1998

[54] CIRCUIT FOR AUTO-NEGOTIATION OVER FIBER-OPTIC MEDIA

[75] Inventors: William S. Bunch, Sunnyvale, Calif.; Todd S. Vafiades, West Buxton, Me.

[73] Assignee: National Semiconductor Corporation, Santa Clara, Calif.

[21] Appl. No.: 525,829

[22] Filed: Sep. 8, 1995

Related U.S. Application Data

[60] Provisional application No. 60/002,291, Aug. 14, 1995.

[51] Int. Cl.[6] .................... H04J 14/08; H04B 10/26
[52] U.S. Cl. .................... 359/152; 359/136; 359/179
[58] Field of Search .................... 359/152–153, 359/175, 176, 179, 186, 188, 195, 136

[56] References Cited

U.S. PATENT DOCUMENTS

| | | | |
|---|---|---|---|
| 5,305,350 | 4/1994 | Budin et al. | 375/12 |
| 5,432,775 | 7/1995 | Crayford | 370/10 |
| 5,535,211 | 7/1996 | Yano | 370/85.2 |
| 5,541,957 | 7/1996 | Lau | 375/258 |
| 5,577,069 | 11/1996 | Lau et al. | 375/242 |

*Primary Examiner*—Leslie Pascal
*Attorney, Agent, or Firm*—Limbach & Limbach L.L.P.

[57] ABSTRACT

A link pulse translation circuit includes transmit portion circuitry that receives a first link pulse signal, having a first level, from a physical layer device. The transmit portion circuitry translates the first link pulse signal into a second link pulse signal that has a second level suitable for driving transmit portion circuitry of an optical transceiver. Receive portion circuitry receives a signal detect signal from receive portion circuitry of an optical transceiver, the receive portion circuitry of the optical transceiver asserting the signal detect signal in response to an optical pulse signal being provided on an optical medium to which the receive portion circuitry of the optical transceiver is coupled. The receive portion circuitry provides a third link pulse signal, having the first level and corresponding to the optical pulse signal, to the physical layer device.

8 Claims, 2 Drawing Sheets

CIRCUIT FOR AUTO-NEGOTIATION OVER FIBER-OPTIC MEDIA

RELATED APPLICATIONS

Priority is claimed under 35 U.S.C. § 120 of Provisional patent application Ser. No. 60/002,291 filed Aug. 14, 1995 by William S. Bunch and Todd S. Vafiades (under Atty. Dckt. No. NSC1-68200 by Express Mail, Label No. TB396605308US) and entitled "Out of Band Configuration Signalling for Digital Fiber Optics Based Data Communications".

TECHNICAL FIELD OF THE INVENTION

The present invention relates to circuitry for auto-negotiation of communication capabilities between stations on Ethernet local area networks, and in particular, to circuitry which provides for auto-negotiation of communication station capabilities of stations connected by fiber-optic media.

BACKGROUND OF THE INVENTION

Auto-negotiation over IEEE 802.3 Ethernet Local Area Networks (LAN's) has been disclosed in co-pending and commonly-assigned patent application Ser. No. 262,769 (filed Jun. 20, 1994 by Brian C. Edem et al.) In general, auto-negotiation (also known as NWAY Autodetect) allows a multi-protocol media access unit (a near-end "MAU") on a local area network to automatically detect the protocols under which another MAU (a "far-end" MAU) on the network can communicate data. Auto-negotiation allows the near-end MAU and the far-end MAU to automatically advertise, detect, and resolve the capabilities of the two stations.

In practice, communication between the two MAU's during auto-negotiation is in the form of fast link pulse ("FLP") bursts, consisting of a maximum of 33 pulses. The 33 pulses include a combination of 17 clock pulses, having a nominal 100 ns pulse width and transmitted nominally every 125 μs, with an optional data pulse, also having a nominal 100 ns pulse width, being interleaved between each pair of adjacent clock pulses. Thus, the pulses (data pulses and clock pulses) can be as close together as 62.5 μs. (Actually, IEEE 802.3 allows the pulses to be as close together as 55.5 μs) The data pulses of a single FLP burst collectively indicate a "link code word". Using the link code words, the two MAU's communicate back and forth in auto-negotiation mode until they have resolved to a common capability configuration. After the MAU's have resolved to a common capability configuration, the MAU's revert to an "in-band" data service mode.

Heretofore, it was thought that fiber optic MAU's could not participate in auto-negotiation. In particular, as defined in various standards (e.g., FDDI), fiber optic MAU's are not required to assert Signal Detect, which indicates an "active" data service link, until energy has been present on the fiber optic medium for 1000 μs This is known as the Signal Detect assertion time requirement. In addition, fiber optic MAU's are not required to deassert Signal Detect until energy has been absent from the fiber optic medium for 350 μs A fiber optic MAU whose Signal Detect assertion and deassertion times approach the values allowed by the FDDI standard will never assert Signal Detect in response to FLP bursts and thus will not recognize the link code words with the FLP bursts as data.

SUMMARY OF THE INVENTION

The present invention is a link pulse translation circuit. The link pulse translation circuit includes transmit portion circuitry that receives a first link pulse signal, having a first level, from a physical layer device. The transmit portion circuitry translates the first link pulse signal into a second link pulse signal that has a second level suitable for driving transmit portion circuitry of an optical transceiver.

Receive portion circuitry receives a signal detect signal from receive portion circuitry of an optical transceiver, the receive portion circuitry of the optical transceiver asserting the signal detect signal in response to an optical pulse signal being provided on an optical medium to which the receive portion circuitry of the optical transceiver is coupled. The receive portion circuitry provides a third link pulse signal, having the first level and corresponding to the optical pulse signal, to the physical layer device.

A better understanding of the features and advantages of the invention will be obtained by reference to the following detailed description and accompanying drawings which set forth an illustrative embodiment in which the principles of the invention are utilized.

DETAILED DESCRIPTION

Figure 1:
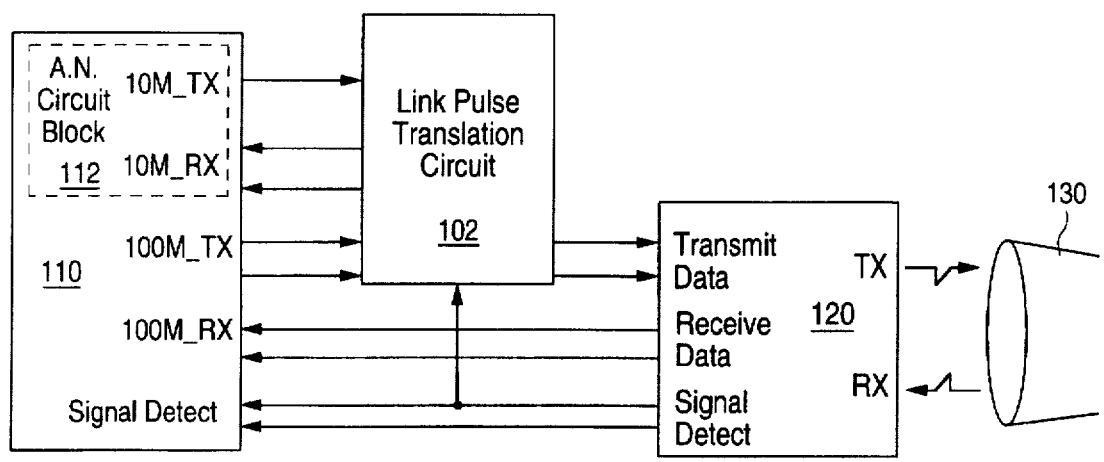
FIG. 1 is a block diagram that illustrates circuitry within a communication station 100 which allows fast link pulses to be transmitted onto, and received off of, a fiber optic medium 130.

FIG. 1 is a block diagram that illustrates circuitry within a communication station 100 which allows fast link pulse ("FLP") bursts to be transmitted onto, and received off of, a fiber optic medium 130. In particular, a link pulse translation circuit 102 in accordance with one embodiment of the present invention, an interface is provided between a conventional auto-negotiation capable physical layer device 110 (e.g., an integrated circuit device known as a "DP83840" and manufactured by National Semiconductor Corporation), and which includes an auto-negotiation circuit 112, and a conventional optical transceiver 120 (e.g., a 1×9 E/O Transceiver Module) such that the communication station 100 can communicate with other stations, via FLP bursts, over the fiber optic media 130 to perform auto-negotiation.

It is an important principle to the present invention that auto-negotiation "owns the medium". That is, signalling that takes place over a medium (e.g., twisted-pair copper wiring) during auto-negotiation is not shared with any other signalling services. "in-band" data service in particular. As a result, the signalling method utilized during in-band data service mode is not required to be the same as that used during auto-negotiation. For example, in the case of 100BASE-FX (which is a 100 Mb/sec protocol for in-band data transfer between communication stations connected by fiber optic media), a continuous signalling method is employed such that received data is rejected as being invalid unless Signal Detect has been active for 330 μs.

The present invention takes advantage of the fact that even very low amounts of energy received at a receive input RX of the optical transceiver 120, such as FLP bursts transmitted over the optical medium 130, cause the Signal Detect of the optical transceiver 120 to become active for a duration that is much less than the minimum separation time between FLP's of an FLP burst used in auto-negotiation (55.5 µs), even though the data provided at a Receive_Data output of the optical transceiver 120 in response to the FLP's may not be valid. Significantly, the link pulse translation circuit 102 uses the timing of the Signal Detect generated by the optical transceiver 120 to regenerate the FLP's received at the receive input RX of the optical transceiver 120. The regenerated FLP's are provided to a data input (e.g., the 10M_RX data input) of the physical layer device 110. As discussed above, it is recognized that the optical transceiver 120 may provide invalid data at its receive output (Receive_ Data) in response to the FLP's received off the fiber optic medium 130. However, since auto-negotiation "owns" the media, the data provided at the Receive_Data in response to the FLP's is not used by the physical layer device 110 during auto-negotiation anyway.

With regard to the transmission of FLP bursts onto the fiber optic medium 130 via a transmit output TX of the optical transceiver 120, the link pulse translation circuit 102 receives FLP's from the 10M_Tx output of the physical layer device 110 and, in response thereto, provides translated FLP's which have a level such that they can drive the Transmit_Data input of the optical transceiver 120.

Figure 2:
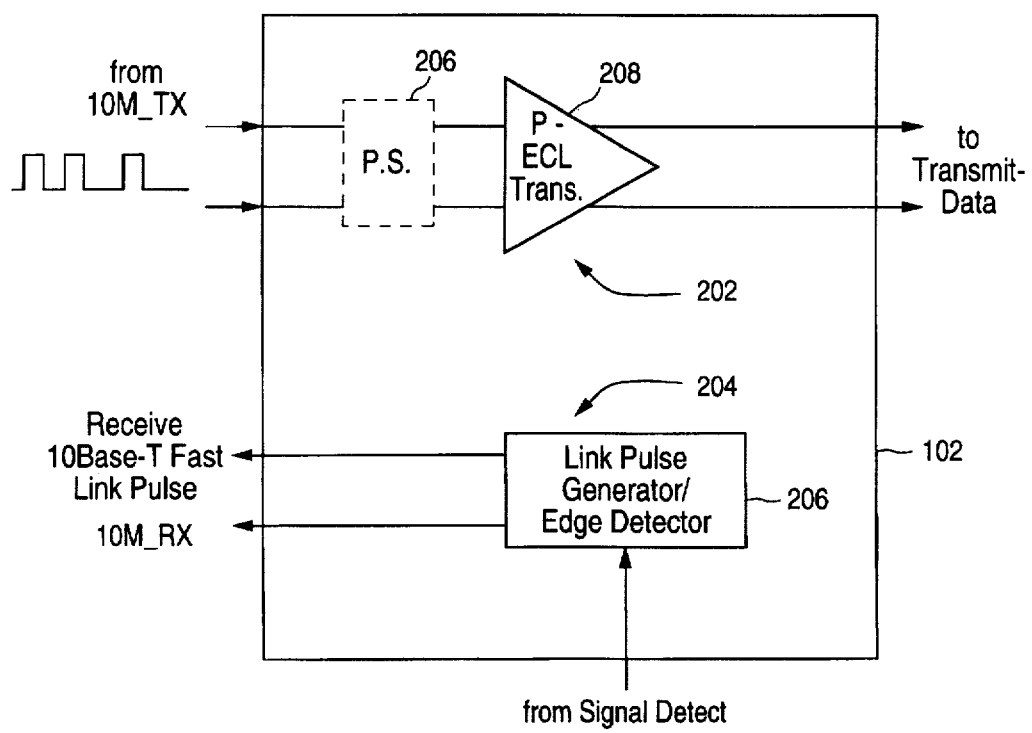
FIG. 2 is a block diagram which shows the link pulse translation circuit 102 of FIG. 1 in greater detail.

Referring now to FIG. 2, the link pulse translation circuit 102 is shown in greater detail. The link pulse translation circuit 102 includes a transmit portion 202 which along with the transmit portion of the optical transceiver 120 provides optical pulses, corresponding to the FLP's received from the 10M_TX output of the physical layer device 110, suitable for transmission over the fiber optic medium 130. First, an optional pulse stretcher circuit 206 (indicated by a dashed line in FIG. 2), if provided, receives the FLP's and generates "stretched", or wider, pulses which otherwise correspond in timing to the FLP's. In particular, since it is the separation of pulses which signifies the bits of the "link data word", the width of the pulses may be varied so long as the width does not exceed the lower allowable limit of FLP separation (i.e., 55 µs). The mount of pulse stretching may be varied to match the receive characteristics of a particular optical transceiver. An ECL translator 208 then translates the FLP's (whether or not stretched) into ECL (or, more properly, pseudo-ECL) level pulse signals which the optical transceiver 120 expects, and these pseudo-ECL level pulse signals are provided to the Transmit_Data input of the optical transceiver 120. The transmit portion of the optical transceiver 120 then outputs, at the transmit output TX, optical pulse signals which correspond to the pseudo-ECL level pulse signals.

Referring still to FIG. 2, the link pulse translation circuit 102 also includes a receive portion 204 which interprets the assertion of Signal Detect from the optical transceiver 120 as a link pulse being received from the optical fiber medium 130 at the receive input RX of the optical transceiver 120. The receive portion 204 includes a link pulse generator/edge detector 206 which generates FLP's and provides the FLP's to a receive input (e.g., the 10M_RX input) of the physical layer device 110.

Figure 3:
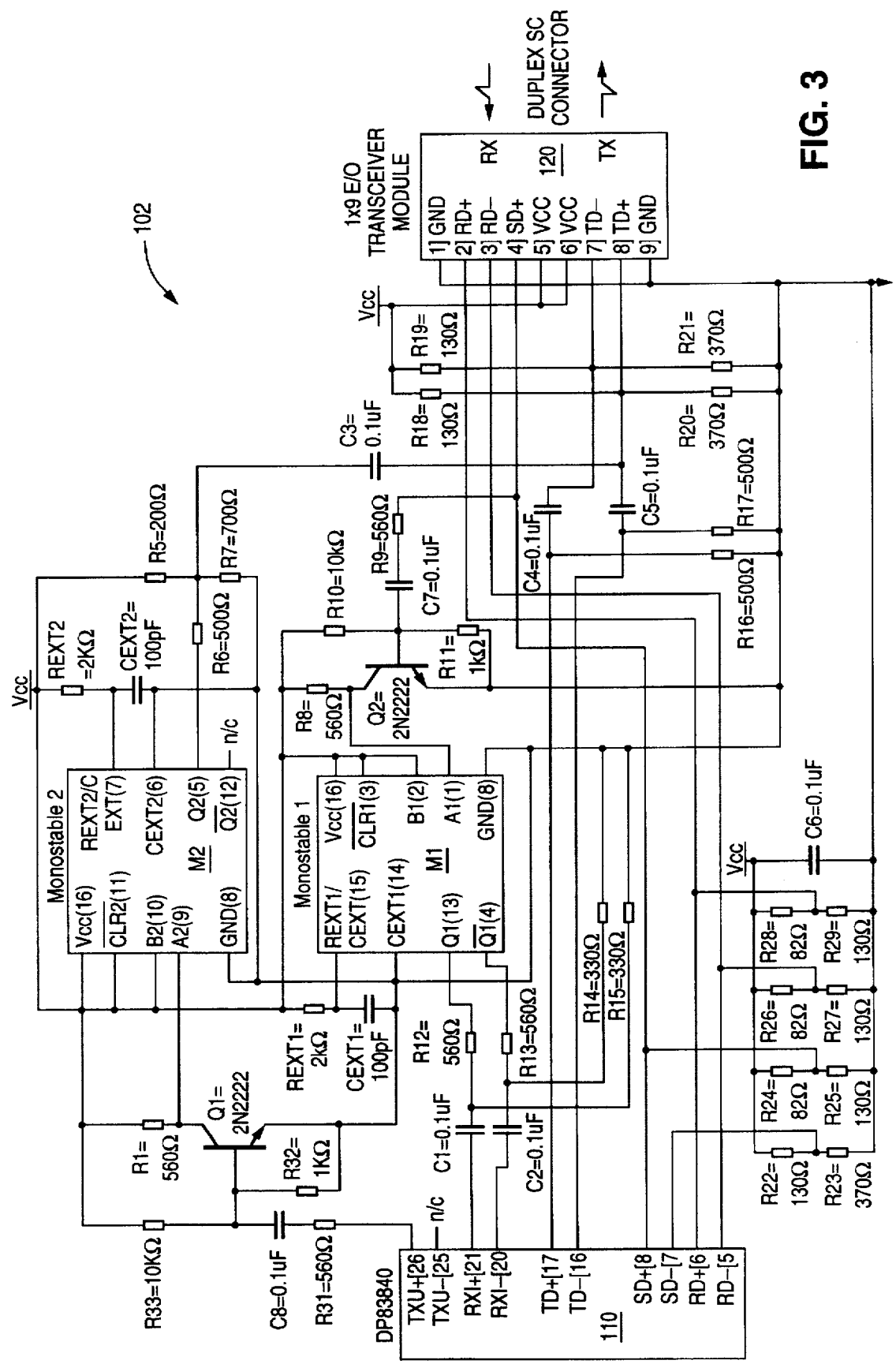
FIG. 3 schematically illustrates the link pulse translation circuit 102 of FIGS. 1 and 2.

FIG. 3 schematically illustrates the details of the link pulse translation circuit 102 and how it may be connected to a National Semiconductor DP83840 physical-layer device 110 and to an LCF 1×9 E/O optical transceiver module 120. Referring to FIG. 3, the transmit portion 202 of the link translation circuit 102 is first described. During auto-negotiation, a series of FLP's, nominally 100 ns wide, are provided at the TXU+ output of the DP83840 physical-layer device 110. As discussed above, each pulse is nominally separated by 125 µs (indicating a "zero" data bit) or by 62.5 µs (indicating a "one" data bit). The TXU+ output swings from approximately 2.75 V to 4.0 V during a single pulse. The TXU- output of the DP83840 physical layer device 110 is not connected.

A 2N2222 transistor Q1 is connected to receive the pulses from the TXU+ output of the DP83840 and to convert the pulse up-transitions into a trigger at the A2 input of a monostable device (or "one-shot") M2. The monostable device M2 may be, for example, an LS221 device manufactured by National Semiconductor Corp. The monostable device M2 has its /CLR2 and B2 inputs connected to Vcc such that the monostable device M2 is triggered by a transition from high to low on the A2 input. In particular, the transistor Q1 is connected as an inverter with a bias point that changes the collector voltage from Vcc to less than 0.8 V when the TXU+ output of the DP83840 physical-layer device 110 changes from 2.75 V to 4.0 V. When the monostable device M2 is triggered, a pulse is produced on the Q2 output of the monostable M2. The width of the pulse produced at the Q2 output is set by resistor REXT2 and capacitor CEXT2. For example, if the resistor REXT2 has a resistance value of 2 KΩ and the capacitor CEXT2 has a capacitance value of 100 pF, the pulse width of the pulse produced at the Q2 output will be approximately 100 ns. It is the resistor network R5, R6, and R7 connected to the Q2 output of the monostable device M2 which translates the signal to be compatible with pseudo-ECL requirements of the 1×9 E/O Transceiver Module 120.

The output of the resistor network R5, R6, R7 is capacitively coupled by capacitor C3 to the TD+ input of the 1×9 E/O Transceiver Module 120. This ensures that the quiescent state of the monostable device M2 does not interfere with proper 100 Mb normal data service operation once auto-negotiation is complete.

The resistor R18 (sized, e.g., at 130 Ω) connected between TD+ of the 1×9 E/O Transceiver Module 120 and ground provides the correct bias for pseudo-ECL switching. The resistor R19 (sized, e.g., at 130 Ω) connected between the TD- of the 1×9 E/O Transceiver Module 120 and Vcc and the resistor R21 (sized, e.g., at 370 Ω) connected between TD- of the 1×9 E/O Transceiver Module 120 and ground provide the correct bias for pseudo-ECL switching. Resistors R16 and R17 (sized, e.g., at 500 Ω), connected between TD+ and ground and TD- and ground, respectively, of the DP83840 physical-layer device 110, provide a DC current path required for proper operation of the TD+ and TD- outputs. Finally, the capacitors C4 and C5 (sized, e.g., at 0.1 µF) coupling the TD+ and TD- outputs of the DP83840 physical layer device 110 to the TD- and TD+ inputs, respectively, of the 1×9 E/O Transceiver Module 120 block the DC component of the TD+ and TD- outputs of the DP83840 physical-layer device from interfering with the PECL link pulse during auto-negotiation.

The receive portion 204 of the link pulse translation circuit 102 is now described. The receive portion 204 generates link pulses at, the RXI+ and RXI- inputs of the DP83840 physical-layer device 110. These link pulses are as specified in clauses 28 and 14 of the IEEE 802.3 standard. As discussed above, the receive portion 204 operates on the principle that the fiber transceiver asserts its Signal Detect output in response to link pulses received from an optical fiber medium. The inventors have verified that the 1×9 E/O Transceiver Module 120 asserts its SD+ output for 15 µs for each link pulse received at its receive input RX from the optical fiber medium.

The SD+ output of the 1×9 E/O Transceiver Module 120 is connected to the input of a transistor Q2 which provides a trigger for a monostable device M1. Specifically, the SD+ output of the 1×9 E/O Transceiver Module 120 transitions from 3.3 V, when no fiber link pulse is present, to 4.1 V when a fiber link pulse is present. The transistor Q2 acts as an inverter which is biased such that the A1 input of the monostable device M1 transitions from Vcc to less than 0.8 V when a fiber link pulse is present.

The/CLR1 and B1 signal pins of the monostable device M1 are connected to Vcc. The transition at the A1 input of the monostable device M1 thus produces a pulse on the Q1 and/Q1 outputs of the monostable device M1. The duration of the pulse is set by resistor REXT1 and CEXT1. For example, if the resistor REXT1 has a resistance value of 2 KΩ and the capacitor CEXT1 has a capacitance value of 100 pF, the pulse width of the pulse produced will be approximately 100 ns. The Q1 output of the monostable device M1 is connected to a first resistor divider constituted by resistors R12, and R15. The Q1 output of the monostable device M1 is connected to second resistor divider constituted by resistors R13 and R14. The output of the first and second resistor dividers are connected to the RXI+ and RXI− inputs, respectively, of the DP83840 physical-layer device 110. The first and second resistor dividers condition the pulse provided from the Q1 and/Q1 outputs of the monostable device M1 to have an amplitude which is appropriate for the DP83840 physical-layer device 110 RXI+ and RXI− inputs. In particular, if the resistors R12 and R13 are each sized at 560 Ω and R14 and R15 are each sized at 330 Ω, the pulse provided to the RXI+ and RXI− inputs of the DP83840 physical layer device 110 has a 2.5 V peak-to-peak differential voltage amplitude.

The SD+ output of the 1×9 E/O Transceiver Module 120 is not only tied directly to the SD+ input of the DP83840 physical-layer device 110 but is also connected to a termination resistor network R24, R25. The SD− signal pins are connected to a termination resistor network R22, R23. The RD+ signal pins are connected to a termination resistor network R26, R27. The RD− signal pins are connected to a termination resistor network R28, R29. The resistor values may be, for example,

R22, 130 Ω; R23, 370 Ω; R24, 82 Ω; R25, 130 Ω; R26, 82 Ω;

R27, 130 Ω; R28, 82 Ω; R29, 130 Ω.

It should be understood that various alternatives to the embodiments of the invention described herein may be employed in practicing the invention. For example, the link pulse translation circuitry may be integrated with (or into) the physical layer device 110. In this case, it would not be necessary to generate intermediate "twisted-pair-level" transmit or receive link pulses. Rather, in such an embodiment, the transmit optical link pulses having a level suitable for driving the transmit circuitry of the optical transceiver 120 are generated directly from transmit auto-negotiation signals received from the auto-negotiation circuit 112. Furthermore, the signal detect signal from the receive circuitry of the optical transceiver 120 is used to generate receive auto-negotiation signals which are provided to the auto-negotiation circuit 112. It is intended that the following claims define the scope of the invention and that methods and apparatus within the scope of these claims and their equivalents be covered thereby.

What is claimed is:

1. A link pulse receive circuit for translating optical link pulses that represent auto-negotiation information and are received from an optical fiber via an optical transceiver, into auto-negotiation signals, comprising:

signal detect receive circuitry that receives a signal detect signal from receive portion circuitry of the optical transceiver, wherein the receive portion circuitry of the optical transceiver asserts the signal detect signal in response to an optical pulse signal, corresponding to the link pulses, being provided on an optical medium to which the receive portion circuitry of the optical transceiver is coupled; and auto-negotiation signal generation circuitry, responsive to the signal detect receive circuitry, that provides auto-negotiation signals suitable for use by auto-negotiation circuitry wherein the signal detect receive circuitry includes:

one-shot circuitry connected to receive the signal detect signal from the receive portion circuitry of the optical transceiver and that generates a trigger signal in response to each first polarity transition of the signal detect signal, wherein the auto-negotiation signal generation circuitry generates the auto-negotiation signals responsive to the trigger signals.

2. A link pulse translation circuit comprising:

transmit portion circuitry that receives a first link pulse signal, having a first level, from a physical layer device and that translates the first link pulse signal into a second link pulse signal that has a second level suitable for driving transmit portion circuitry of an optical transceiver;

receive portion circuitry that receives a signal detect signal from receive portion circuitry of an optical transceiver, wherein the receive portion circuitry of the optical transceiver asserts the signal detect signal in response to an optical pulse signal being provided on an optical medium to which the receive portion circuitry of the optical transceiver is coupled, and that provides a third link pulse signal, having the first level, to the physical layer device, wherein the transmit portion circuitry includes:

pulse stretching circuitry that receives the first link pulse signal, wherein the first link pulse signal includes a first plurality of link pulses having a first duration, and provides a stretched link pulse signal comprising a second plurality of link pulses having a second duration greater than the first duration; and level setting circuitry that receives the stretched link pulse signal and that provides the second link pulse signal, having the second level and including a third plurality of link pulses having the second duration, in response thereto.

3. A link pulse translation circuit as in claim 2, wherein the pulse stretching circuitry includes:

one-shot circuitry connected to receive the first link pulse signal at an input and that generates a trigger signal in response to each first polarity transition of the first link pulse signal;

pulse-width setting circuitry connected to receive the trigger signals and that responds to each trigger signal by generating a pulse of the second duration, the pulses generated by the pulse-width setting circuitry collectively constituting the stretched link pulse signal.

4. A link pulse translation circuit as in claim 2, and further comprising:

capacitive coupling circuitry that capacitively couples the level setting circuitry to the transmit portion circuitry of the optical transceiver.

5. A link pulse translation circuit comprising:

transmit portion circuitry that receives a first link pulse signal, having a first level, from a physical layer device and that translates the first link pulse signal into a second link pulse signal that has a second level suitable for driving transmit portion circuitry of an optical transceiver;

receive portion circuitry that receives a signal detect signal from receive portion circuitry of an optical transceiver, wherein the receive portion circuitry of the optical transceiver asserts the signal detect signal in response to an optical pulse signal being provided on an optical medium to which the receive portion circuitry of the optical transceiver is coupled, and that provides a third link pulse signal, having the first level, to the physical layer device, wherein the receive portion circuitry includes:

one-shot circuitry connected to receive the signal detect signal from the receive portion circuitry of the optical transceiver and that generates a trigger signal in response to each first polarity transition of the signal detect signal; and pulse generating circuitry that receives the trigger signal and that responds to each trigger signal by generating a pulse, the pulses generated by the pulse-width setting circuitry collectively constituting the third link pulse signal.

6. A method of interfacing a physical layer device to an optical transceiver such that auto-negotiation signals can be transferred over an optical medium between a first communication station and a second communication station, the method comprising:

a) receiving a first link pulse signal, having a first level and representing configuration information of the first communication station, from the physical layer device within the first communication station and translating the first link pulse signal into a second link pulse signal that has a second level suitable for driving transmit portion circuitry of an optical transceiver within the first communication station;

b) receiving a signal detect signal from receive portion circuitry of the optical transceiver within the first communication station, wherein the receive portion circuitry of the optical transceiver asserts the signal detect signal in response to an optical pulse signal, which represents configuration information of the second communication station, being provided on an optical medium to which the receive portion circuitry of the optical transceiver is coupled, and providing a third link pulse signal, having the first level, to the physical layer device within the first communication station wherein step a) includes:

i) receiving the first link pulse signal, wherein the first link pulse signal includes a first plurality of link pulses having a first duration, and proving a stretched link pulse signal having the first level but including a second plurality of link pulses having a second duration greater than the first duration; and ii) receiving the stretched link pulse signal and translating the stretched link pulse signal into the second link pulse signal, wherein the second link pulse signal includes a third plurality of link pulses having the second duration.

7. The method of claim 6, wherein step ii) includes:

receiving the first link pulse signal and generating a trigger signal in response to each first polarity transition of the first link pulse signal;

receiving the trigger signals and responding to each trigger signal by generating a pulse of the second duration, the pulses generated in response to the trigger signals collectively constituting the stretched link pulse signal.

8. A method of interfacing a physical layer device to an optical transceiver such that auto-negotiation signals can be transferred over an optical medium between a first communication station and a second communication station, the method comprising:

a) receiving a first link pulse signal, having a first level and representing configuration information of the first communication station, from the physical layer device within the first communication station and translating the first link pulse signal into a second link pulse signal that has a second level suitable for driving transmit portion circuitry of an optical transceiver within the first communication station;

b) receiving a signal detect signal from receive portion circuitry of the optical transceiver within the first communication station, wherein the receive portion circuitry of the optical transceiver asserts the signal detect signal in response to an optical pulse signal, which represents configuration information of the second communication station, being provided on an optical medium to which the receive portion circuitry of the optical transceiver is coupled, and providing a third link pulse signal, having the first level, to the physical layer device within the first communication station, wherein step b) includes:

i) receiving the signal detect signal from the receive portion circuitry of the optical transceiver and generating a trigger signal in response to each first polarity transition of the signal detect signal; and ii) receiving the trigger signal and responding to each trigger signal by generating a pulse, the pulses generated in response to the trigger signals collectively constituting the third link pulse signal.

\* \* \* \* \*